Patented Jan. 27, 1925.

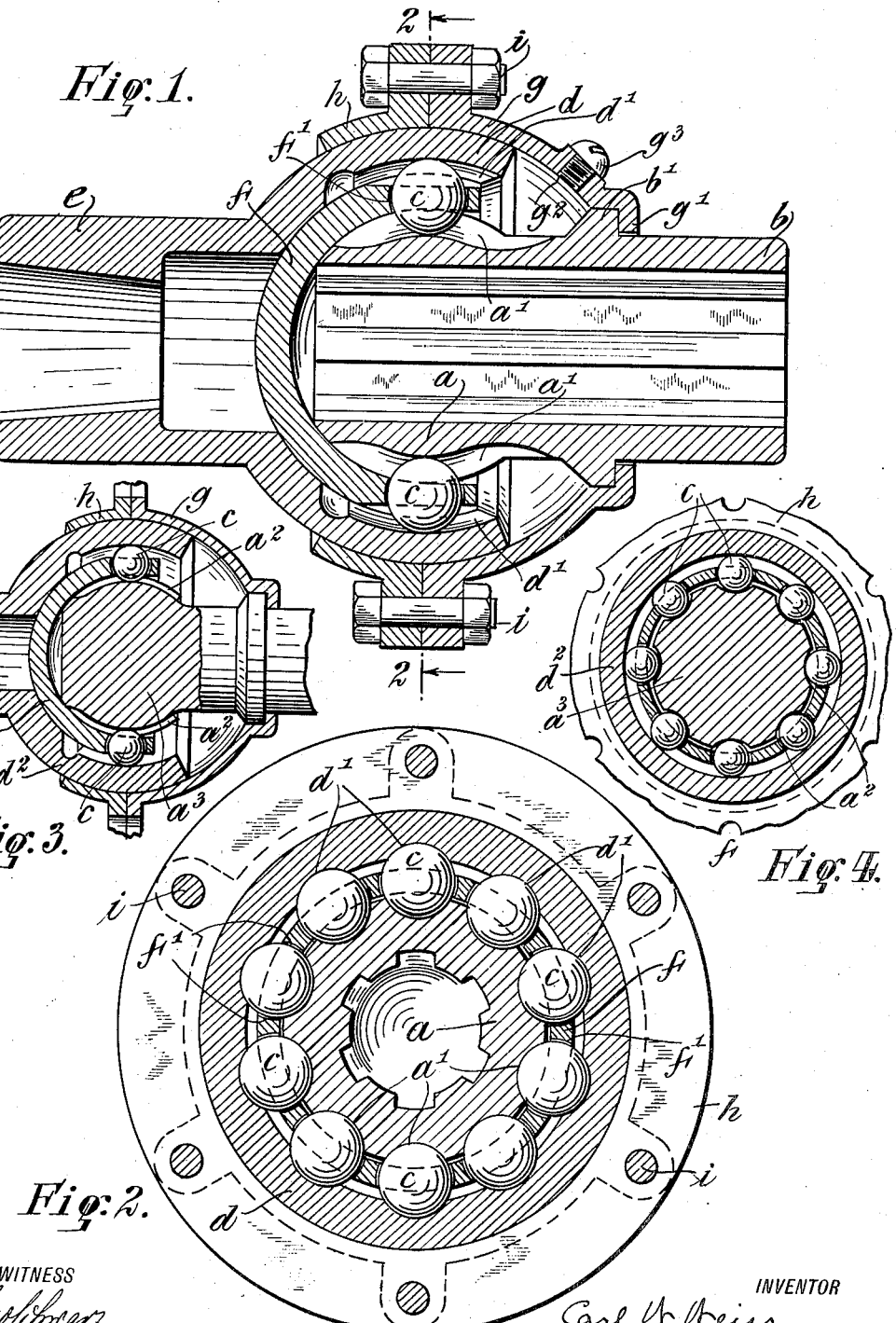

1,524,161

UNITED STATES PATENT OFFICE.

CARL W. WEISS, OF BROOKLYN, NEW YORK, ASSIGNOR OF ONE-HALF TO CLARENCE B. STURGES, OF FAIRFIELD, CONNECTICUT.

UNIVERSAL JOINT.

Application filed June 16, 1920, Serial No. 389,302. Renewed November 18, 1924.

*To all whom it may concern:*

Be it known that I, CARL WILLIAM WEISS, a citizen of the United States, residing in the borough of Brooklyn of the city of New York, in the State of New York, have invented certain new and useful Improvements in Universal Joints, of which the following is a specification, reference being had to the accompanying drawings, forming a part hereof.

The object of this invention is to produce a universal joint which shall be of comparatively simple construction, shall be capable of transmitting any degree of power in any position without danger of breakage, and in which friction shall be reduced to a minimum. In accordance with the invention one of the members of the joint is formed with grooves lying in planes which pass through the axes of the respective members and balls maintained in position by a suitable cage or carrier, are interposed between the ball member and the socket member and effect driving connection of the two members whatever may be their relative angular positions. The invention will be more fully explained hereinafter with reference to the accompanying drawing in which it is illustrated and in which:—

Figure 1 is a view in longitudinal, axial section of a form of universal joint which embodied the invention.

Fgiure 2 is a view of the same in transverse section on the plane indicated by the broken line 2—2 of Figure 1.

Figures 3 and 4 are views, similar respectively to Figures 1 and 2, showing a modified embodiment of the invention.

In the embodiment of the invention illustrated in Figures 1 and 2 of the drawing, the ball member $a$ of the joint is shown as formed on a sleeve $b$ which is adapted to be engaged by the corresponding shaft member. The ball member is formed with longitudinal grooves $a'$, which lie in planes which include the axis of the ball member and are suitably formed in cross section to receive the coupling balls $c$.

The socket member $d$ of the joint is similarly formed on the end of a sleeve $e$ adapted to have driving engagement with the corresponding shaft member, and is formed interiorly with longitudinal grooves $d'$, in planes which include the axis of the socket member and are also adapted to receive the coupling balls $c$. A partly spherical shell $f$, formed with openings $f'$ to receive the balls, encompasses the end of the socket member of the joint and, having its edge portion interposed between the ball member and the socket member, maintains the balls $c$ in proper distribution and constitutes a ball cage or ball carrier. A partly spherical shell or casing made in two parts, $g$ and $h$, held together, when assembled, by bolts $i$, is flanged, as at $g'$, for co-operation with a shoulder $b'$ of the ball member of the joint, and may be provided with an oil hole as at $g^2$, to be closed by screw $g^3$.

In assembling the joint the parts $g$ and $h$ of the shell or casing having been slipped upon the respective shaft members, the ball carrier $f$ is placed in position in the socket member $d$ and the balls are placed in the carrier. The ball member $a$ is then inserted and the two parts $g$ and $h$ of the shell or casing are brought together and secured by the bolts $i$. The casing $g$, $h$ not only serves to prevent the parts of the joint from being separated by relative longitudinal movement, but constitutes a means to limit the relative angular displacement of the two members, the sleeve $e$ striking against the edge of the casing member $h$ when the limit of angular displacement is reached.

It will be observed that in the operation of the joint there is a constant nutating movement of the joint members and the coupling balls with their carrier whether the angle of displacement of the two members be at its maximum or minimum or at any intermediate degree and that the balls, while having a driving engagement with the two joint members and effectively coupling them for rotation together about their respective axes, roll freely in the grooves $a'$ and $d'$ and that there is therefore a minimum of friction in the operation of the joint in any relative angular position of those two members.

In the construction shown in Figures 3 and 4 the grooves in the socket member $d^2$ are dispensed with and the grooves $a^2$ of the ball memmber $a^3$ are formed on a greater radius than the balls themselves so that the balls, rolling freely in longitudinal planes as before, may also roll to a limited extent transversely on the bottom of the grooves and so be forced against the socket member and made to have a driving engagement with both members in the manner of a ball clutch. In other respects the operation of this form of the joint is the same as that already described.

It will be understood that other changes in details of construction and arrangement can be made to suit different conditions of use and that the invention, except as pointed out in the claims, is not limited to the precise construction shown and described herein.

I claim as my invention:

1. A universal joint having a ball member with external longitudinal grooves, a socket member with internal longitudinal grooves, coupling balls interposed between the ball member and the socket member and respectively engaging the corresponding grooves of the ball member and socket member, and a two-part casing engaging the socket member and the ball member and serving to prevent displacement of the two members and to limit relative angular displacement of the two members.

2. A universal joint having a ball member, a socket member, one of said members having longitudinal grooves in its working face, coupling balls interposed between said member and placed in said grooves and adapted to have a driving engagement with the working face of the other member, and a casing engaging the socket member and the ball member and serving to prevent displacement of said members.

This specification signed this 12th day of June A. D., 1920.

CARL W. WEISS.